No. 646,348. Patented Mar. 27, 1900.
H. BLUMENBERG, JR. & F. C. OVERBURY.
SECONDARY BATTERY.
(Application filed Dec. 1, 1898.)
(No Model.)
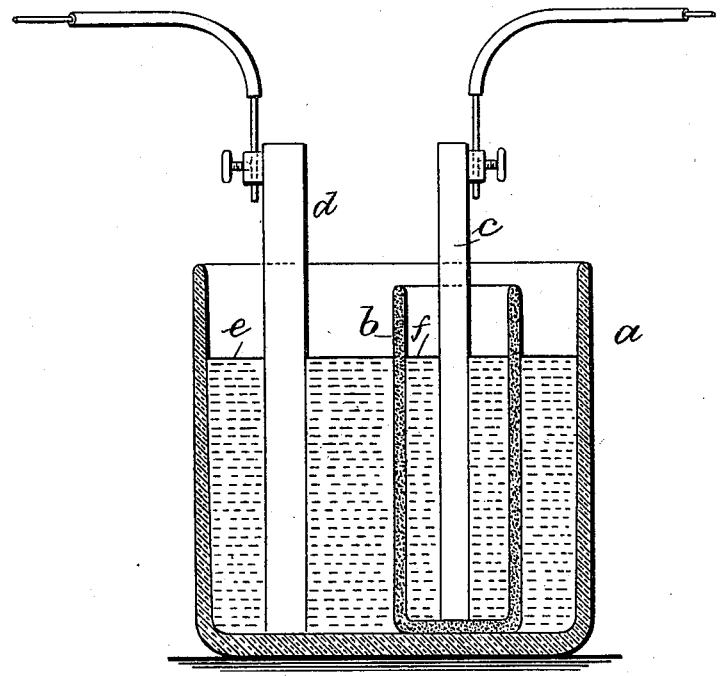
Witnesses
Chas. H. Smith
E. E. Pohle
Inventors
Henry Blumenberg Jr
Frederick C. Overbury
per L. W. Serrell & Son
Attys

UNITED STATES PATENT OFFICE.

HENRY BLUMENBERG, JR., AND FREDERICK C. OVERBURY, OF NEW YORK, N. Y.

SECONDARY BATTERY.

SPECIFICATION forming part of Letters Patent No. 646,348, dated March 27, 1900.

Application filed December 1, 1898. Serial No. 697,996. (No model.)

*To all whom it may concern:*

Be it known that we, HENRY BLUMENBERG, Jr., residing in the city of New York, (Wakefield,) in the borough of Bronx, and FREDERICK C. OVERBURY, residing in the city and county of New York, State of New York, citizens of the United States, have invented an Improvement in Secondary Batteries, of which the following is a specification.

We make use of two dissimilar metallic electrodes and a porous partition between them and two electrolytic liquids, one of which contains an acid solution and the other a solution of an alkali metal or alkaline-earth metal, the object being to obtain the action and reaction required in secondary batteries, not only between the electrolytic solution and the metallic electrodes, but also between the electrolytic solutions through the porous partition.

In the drawing we have represented by a vertical section a battery illustrating our invention.

In carrying out our invention we find it advantageous to employ about a ten-per-cent. solution $e$ of sulfuric acid with a lead electrode $d$ and to employ a solution $f$ of bisulfate of soda with a zinc electrode $c$, and by introducing into the acid solution a small amount of bisulfate of soda or of another alkali metal or alkaline-earth metal the electrolyte in which the lead or similar electrode $d$ is placed assumes in the beginning of its action when it is first charged a condition similar to what it would assume in the process of time by the bisulfate of the alkali passing through the porous partition. In the storage or secondary battery $a$ thus provided the alkali-bisulfate solution $f$ prevents the zinc $c$ being acted upon and reduced to a sulfate with unnecessary rapidity, and while the battery is being charged the peroxid of lead is rapidly developed and there is an action and reaction in charging and discharging between the alkaline bisulfate in the one cell and the acid solution in the other cell in addition to the action and reaction upon the zinc or similar electrode, the essential elements of this secondary battery $a$ being the two dissimilar metallic electrodes $c$ and $d$, a porous partition $b$ between them, an acid solution $e$ for one electrode $d$, and a bisulfate solution $f$ of an alkali for the other electrode $c$.

We claim as our invention—

1. A secondary or storage battery containing two different electrodes and a porous partition, a solution of sulfuric acid for one electrode and a bisulfate of an alkali metal in solution for the other electrode, substantially as set forth.

2. A storage or secondary battery having different metallic electrodes and a porous partition between them, a solution of sulfuric acid and an alkali-metal bisulfate, such as bisulfate of soda for one electrode and a bisulfate of an alkali metal or alkaline-earth metal for the other electrode, substantially as set forth.

3. A secondary battery having one electrode of lead and the other electrode of zinc, a porous partition between them, an electrolytic solution for the lead electrode of sulfuric acid and a sulfate of an alkali metal and a solution for the zinc electrode of bisulfate of soda, substantially as set forth.

Signed by us this 30th day of November, 1898.

HENRY BLUMENBERG, JR.
FREDK. C. OVERBURY.

Witnesses:
GEO. T. PINCKNEY,
S. T. HAVILAND.